(12) United States Patent
Yamamoto

(10) Patent No.: US 8,250,501 B2
(45) Date of Patent: Aug. 21, 2012

(54) DYNAMIC RECONFIGURATION COMPUTER PRODUCT, APPARATUS, AND METHOD

(75) Inventor: Tatsuya Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 240 days.

(21) Appl. No.: 12/656,531

(22) Filed: Feb. 2, 2010

(65) Prior Publication Data

US 2010/0146257 A1  Jun. 10, 2010

Related U.S. Application Data

(63) Continuation of application No. PCT/JP2007/065913, filed on Aug. 15, 2007.

(51) Int. Cl.
*G06F 17/50* (2006.01)
(52) U.S. Cl. ............... 716/101; 716/104; 716/113
(58) Field of Classification Search .......... 716/101, 716/104, 113
See application file for complete search history.

(56) References Cited

U.S. PATENT DOCUMENTS

| 5,751,967 A * | 5/1998 | Raab et al. ............... 709/228 |
| 2003/0140222 A1 | 7/2003 | Ohmi et al. | |

FOREIGN PATENT DOCUMENTS

| JP | 10-320376 | 12/1998 |
| JP | 11-232081 | 8/1999 |
| JP | 2004-362446 | 12/2004 |
| JP | 2006-215592 | 8/2006 |
| WO | 01/95099 | 12/2001 |

OTHER PUBLICATIONS

International Preliminary Report on Patentability, mailed Mar. 18, 2010, in corresponding International Application No. PCT/JP2007/065913 (6 pp.).
International Search Report for PCT/JP2007/065913, mailed Sep. 11, 2007.

* cited by examiner

*Primary Examiner* — Thuan Do
(74) *Attorney, Agent, or Firm* — Staas & Halsey LLP

(57) ABSTRACT

A computer-readable recording medium stores therein a dynamic reconfiguration program that switches process by process, execution of a series of processes for which reconfiguration is to be performed, from execution by software over to execution by hardware. The dynamic reconfiguration program causes a computer to execute detecting in an order reverse to that in which the series of processes is executed, a process that is among the series of processes and under execution by the software; building on the hardware, a logic circuit realizing a function of the detected process; and switching execution of the process from execution by the software over to execution by the built logic circuit.

12 Claims, 12 Drawing Sheets

```
appli(){ while(){
    S1();
    S2();
    S3();
    S4();
  }//while
```

| H1_done | 1 |
| --- | --- |
| H2_done | 0 |
| H3_done | 0 |
| H4_done | 0 |

FIG.12

```
appli(){
    MAN_start();

while(){
    if(H1-done){
        h1_start();
        exit();
    }else{
        S1();
        if(H2-done){
            h2_start();
            h2_wait();
        }else{
            S2();
            if(H3-done){
                h3_start();
                h3_wait();
            }else{
                S3();
                if(H4-done){
                h4_start();
                h4_wait();
                }else{
                S4();
                }
            }
        }
    }
} //while
```

DYNAMIC RECONFIGURATION COMPUTER PRODUCT, APPARATUS, AND METHOD

CROSS-REFERENCE TO RELATED APPLICATIONS

This application is a U.S. Continuation Application filed under 35 U.S.C. §111(a) claiming priority benefit of International Application PCT/JP2007/065913, filed on Aug. 15, 2007, the disclosures of which are incorporated herein by reference.

FIELD

The embodiments discussed herein are related to a dynamic reconfiguration computer product, apparatus, and method.

BACKGROUND

Generally, software enables flexible design change to offer high versatility, but consumes much processing time in executing a task, inviting increased power consumption. Dedicated hardware, such as an application specific integrated circuit (ASIC), achieves high-speed processing to shorten the processing time required for executing a task and thus can reduce power consumption, but lacks versatility in that design change is difficult.

Reconfigurative hardware, such as a field programmable gate array (FPGA), falls between the above software and dedicated hardware. Reconfigurative hardware has features of high-speed processing and low power consumption, and further offers a software-oriented feature of enabling circuit configuration rewriting.

In recent years, techniques using such reconfigurative hardware have been provided, by which hardware is programmed during the execution of a task to dynamically reconfigure a circuit configuration (see, e.g., Japanese Laid-Open Patent Publication Nos. 2006-215592 and H10-320376). According to these techniques, circuit configuration is dynamically reconfigured to realize many functions using few hardware resources and configure a circuit offering various functions to speed up processing.

However, with the conventional techniques described in the above patent documents, hardware reconfiguration itself consumes much time resulting in a time lag until the execution of a task begins, leading to a problem of a drop in output response.

A problem of the conventional techniques will be described in detail with respect to moving image reproduction as an example. FIG. 13 is an explanatory diagram depicting a problem of the conventional techniques. In FIG. 13, a graph 1310 and a graph 1320 depict a change in quality (e.g., image quality) that results upon reproduction of a moving image. In the graphs 1310 and 1320, the vertical axis represents quality and the horizontal axis represents time.

The graph 1310 depicts a change in the quality of a moving image in a case where sequential reconfiguration of hardware ("HW" in FIG. 13) is necessary. In this case, a blank screen continues from the issue of a moving image reproduction instruction to the completion of hardware reconfiguration, and then a clear moving image "quality $q_4$" is reproduced at a time $t_3$.

In other words, a blank screen is displayed for a while after the issue of the reproduction instruction, which results in a drop in output response. As a result, the user views a blank screen for a while after the issue of the reproduction instruction, thus may experience stress because of the delay in the display of the moving image.

The graph 1320 depicts a change in the quality of a moving image in a case where reproduction is alternatively executed by software ("SW" in FIG. 13) before the completion of hardware reconfiguration. In this case, a low-quality moving image "quality $q_1$" is reproduced from the issue of a moving image reproduction instruction until the completion of hardware reconfiguration, and then a clear moving image "quality $q_4$" is reproduced at the time $t_3$.

In other words, the low-quality moving image is displayed for a while after the issue of the reproduction instruction, which results in a drop in output response. Consequently, the user views the low-quality moving image for a while after the issue of the reproduction instruction and thus may experience stress because the display of the moving image is difficult for the user to see.

SUMMARY

According to an aspect of an embodiment, a computer-readable recording medium stores therein a dynamic reconfiguration program that switches process by process, execution of a series of processes for which reconfiguration is to be performed, from execution by software over to execution by hardware. The dynamic reconfiguration program causes a computer to execute detecting in an order reverse to that in which the series of processes is executed, a process that is among the series of processes and under execution by the software; building on the hardware, a logic circuit realizing a function of the detected process; and switching execution of the process from execution by the software over to execution by the built logic circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is an explanatory diagram of an example of a program for executing the dynamic reconfiguration procedure.

DESCRIPTION OF EMBODIMENTS

Preferred embodiments of the present invention will be explained with reference to the accompanying drawings.

Figure 1:
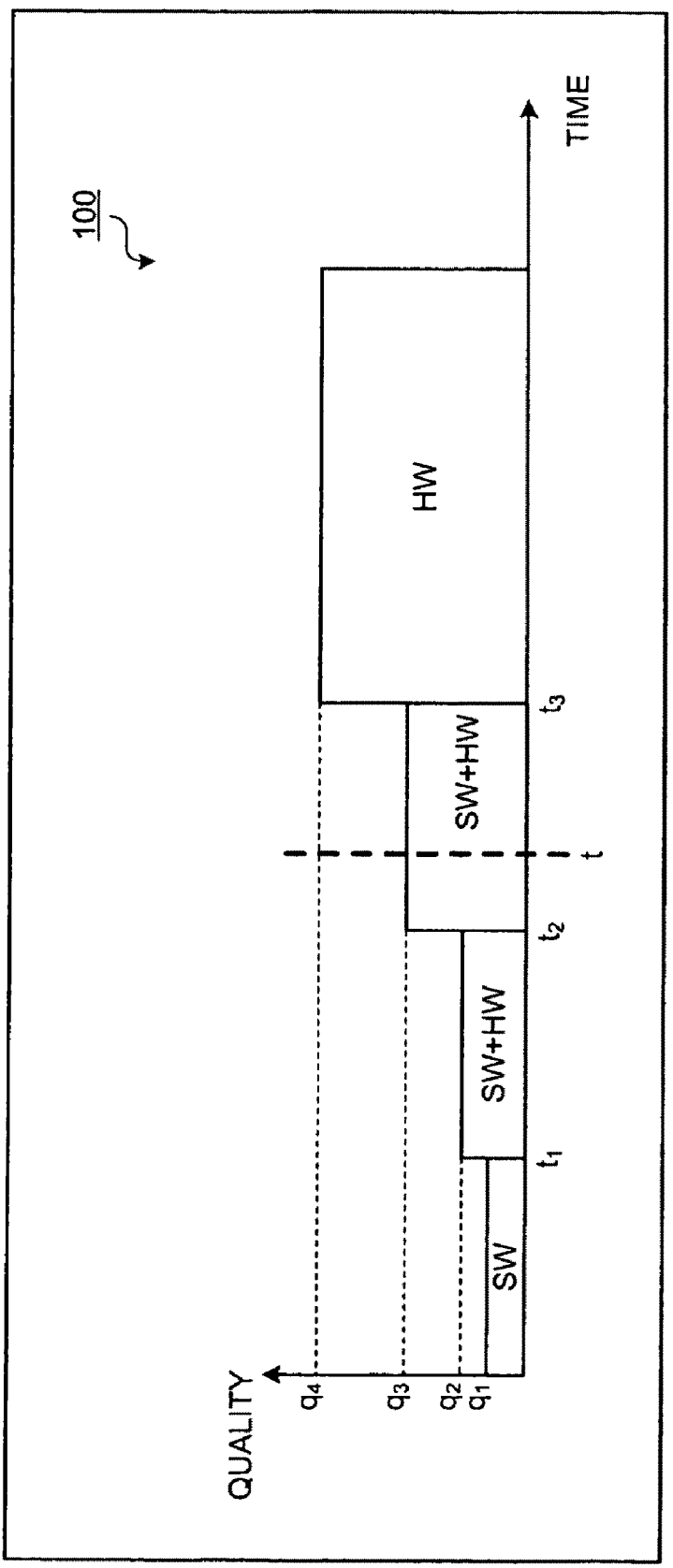
FIG. 1 is a schematic of an embodiment.

FIG. 1 is a schematic of an embodiment. In FIG. 1, a graph 100 depicts a change in quality that results upon reproduction of a moving image (vertical axis represents quality while horizontal axis represents time). As depicted in the graph 100, the quality upon reproduction of the moving image gradually improves over time. The quality is, for example, an index indicative of image quality, bit rate, etc.

For example, prior to reconfiguration, the moving image is reproduced only by software, so that a low-quality moving image (quality $q_1$) is reproduced. Subsequently, first stage reconfiguration is completed at a time $t_1$, after which the moving image is reproduced with a quality $q_2$ ($q_2 > q_1$). Second stage reconfiguration is then completed at a time $t_2$, after which the moving image is reproduced with a quality $q_3$ ($q_3 > q_2$). Finally, third stage reconfiguration is completed at a time $t_3$, after which the moving image is reproduced with a quality $q_4$ ($q_4 > q_3$).

Figure 13:
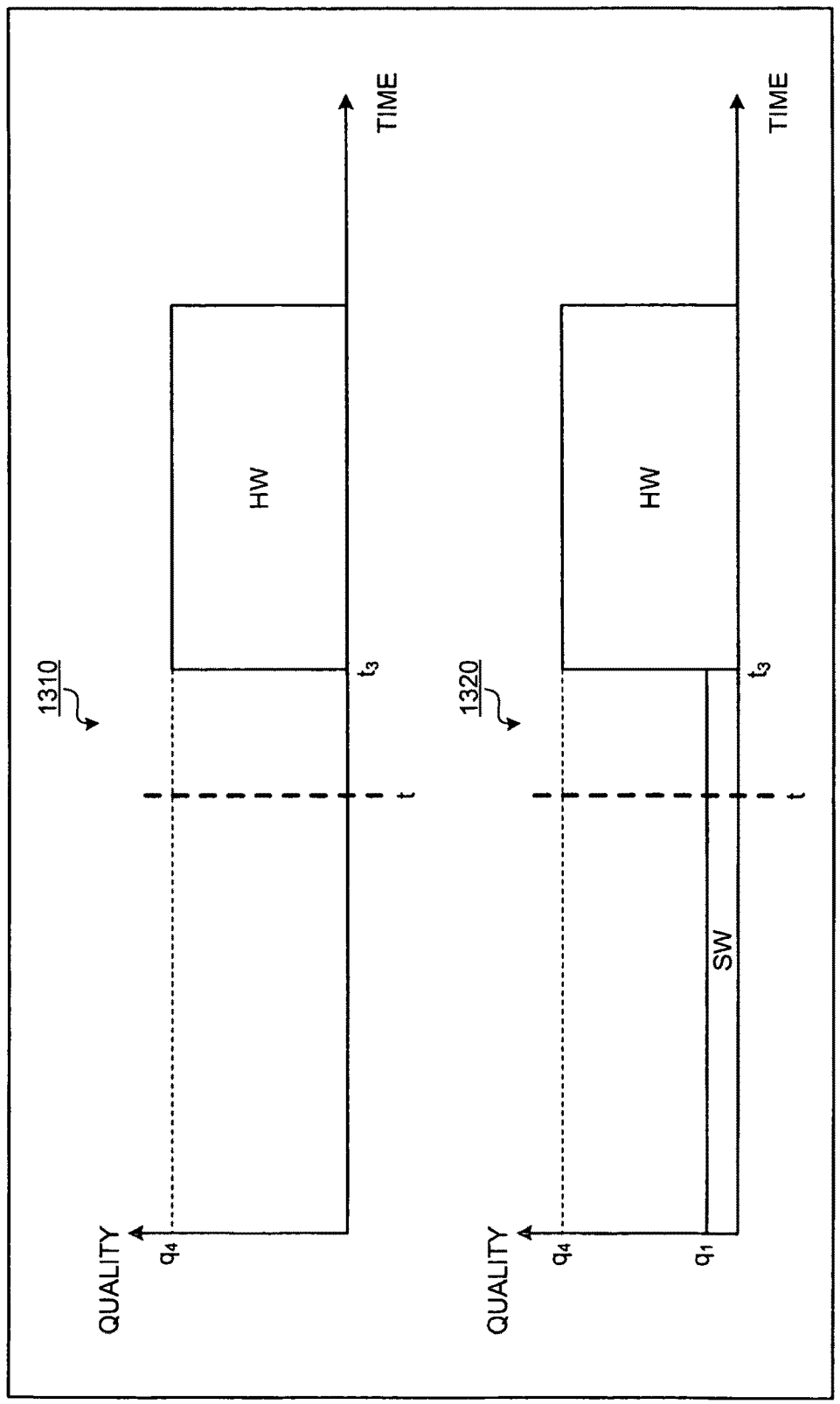
FIG. 13 is an explanatory diagram depicting a problem of the conventional techniques.

According to the embodiment, a series of processes under execution by software are executed by hardware process by process through process-by-process switching from software over to hardware, thereby gradually improving the quality of the moving image ($q_1 \rightarrow q_2 \rightarrow q_3 \rightarrow q_4$). Hence, the quality at time t in the graph 100 becomes higher than the quality at the time t in the graphs 1310 and 1320 depicted in the description of the conventional technique (see FIG. 13).

Figure 2:
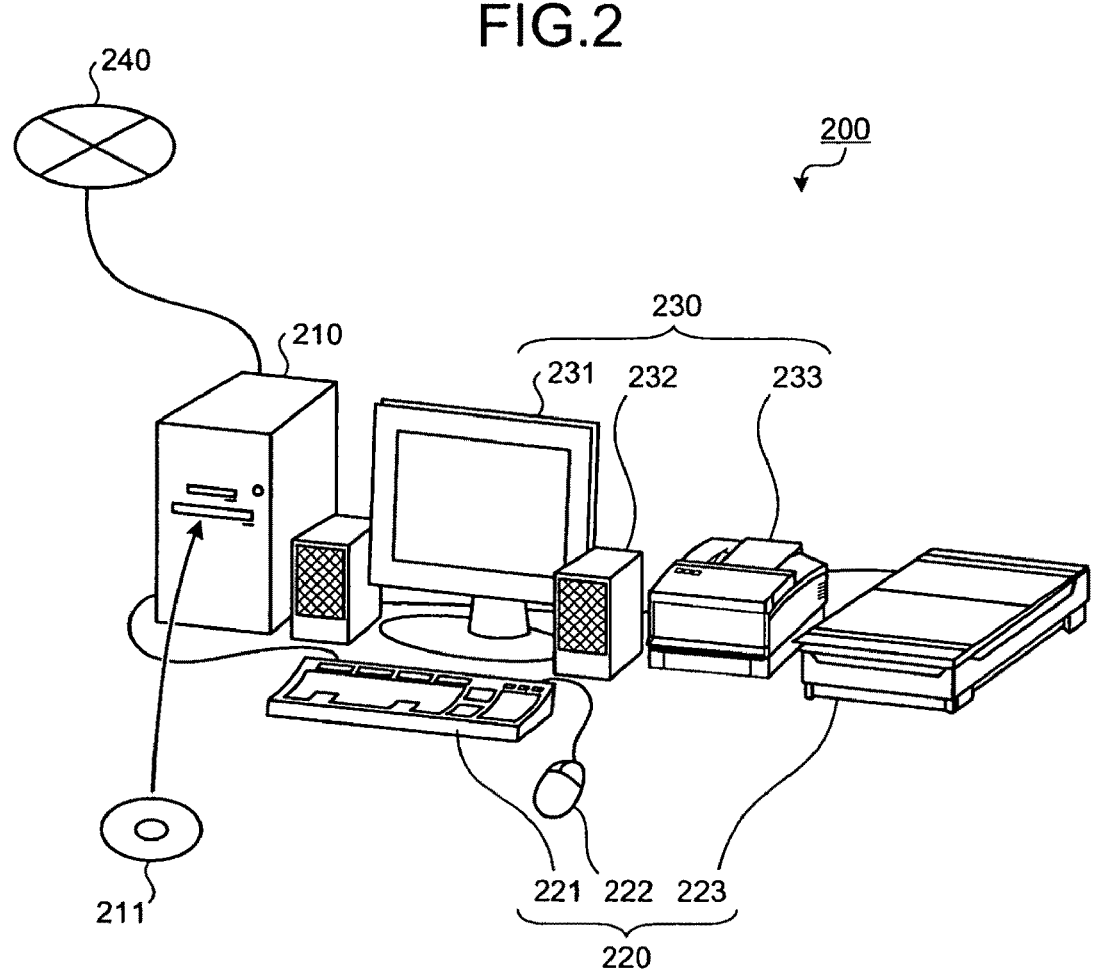
FIG. 2 is a schematic of a hardware configuration of a dynamic reconfiguration apparatus according to the embodiment.

FIG. 2 is a schematic of a hardware configuration of a dynamic reconfiguration apparatus 200 according to the embodiment.

As depicted in FIG. 2, the dynamic reconfiguration apparatus 200 includes a computer 210, an input device 220, and an output device 230 and is connectable to a network 240 such as a local area network (LAN), wide area network (WAN), or the Internet via a router or a modem (not depicted).

The computer 210 includes a central processing unit (CPU), a memory, and an interface. The CPU governs overall control of the dynamic reconfiguration apparatus 200. The memory includes a read-only memory (ROM), a random access memory (RAM), a hard disk (HD), an optical disk 211, and a flash memory. The memory is used as a work area of the CPU.

The memory stores various programs, which are loaded according to an instruction from the CPU. The reading and writing of data with respect to the HD and the optical disk 211 are controlled by a disk drive. Further, the optical disk 211 and the flash memory are removable from the computer 210. The interface controls input from input device 220, output to the output device 230, and communication with the network 240.

The input device 220 includes a keyboard 221, a mouse 222, and a scanner 223. The keyboard 221 includes keys for the input of text, numerals, and various instructions. Further, the input device 220 may be a touch panel type device. The mouse 222 moves a cursor, determines an area, moves a window, changes the dimensions of a window, etc. The scanner 223 optically scans an image. The scanned image is taken in as image data and stored in the memory of the computer 210. The scanner 223 may have an optical character recognition (OCR) function.

The output device 230 includes a display 231, a speaker 232, and a printer 233. The display 231 displays a cursor, icons, toolboxes, and data such as documents, images, and function information. The speaker 232 outputs sound such as a sound effect, a text-to-voice converted sound, and the like. The printer 233 prints image data and text data.

Figure 3:
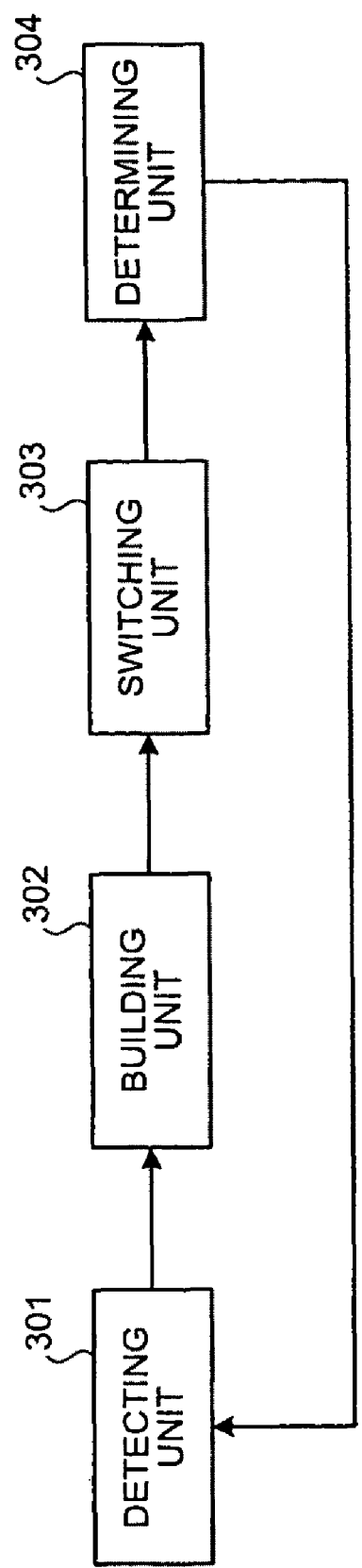
FIG. 3 is a block diagram of a functional configuration of the dynamic reconfiguration apparatus.

FIG. 3 is a block diagram of a functional configuration of the dynamic reconfiguration apparatus 200. As depicted in FIG. 3, the dynamic reconfiguration apparatus 200 includes a detecting unit 301, a building unit 302, a switching unit 303, and a determining unit 304.

Functions of the functional units 301 to 304 are implemented by causing the CPU to execute relevant programs stored in a memory area. Data output from the functional units 301 to 304 is saved to the memory area. Functions of the functional units 301 to 304 at connection destinations indicated by arrows in FIG. 3 are implemented by causing the CPU to read from the memory, data output from the functional unit 301 to 304 at the connection origin and by further by causing the CPU to execute a relevant program.

The dynamic reconfiguration apparatus 200 has a function of switching, process by process, the execution of a series of processes for which reconfiguration is to be performed, from execution by software to execution by hardware. Execution by software means execution of a program(s) realizing various functions, the execution being by the CPU. Execution by hardware means execution by a dedicated logic circuit(s) prepared to realize the various functions.

The above hardware is a semiconductor integrated circuit whose circuit configuration is rewritable, and may be, for example, an FPGA, a complex programmable logic device (CPLD), etc. Each process making up a series of processes is executable by both software and such hardware.

The detecting unit 301 detects a process under execution by software, among a series of processes for which reconfiguration is to be performed. A series of processes is a group of processes that are executed in a predetermined order. The detected process is a process under execution by software, and may be singular or plural.

Figure 4:
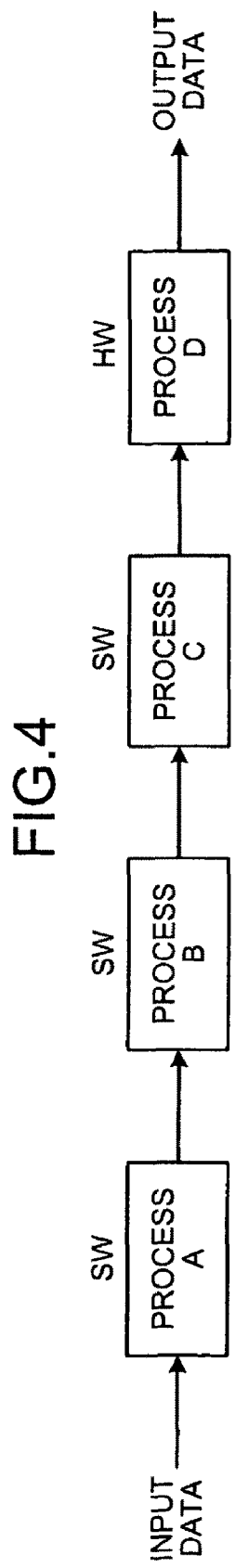
FIG. 4 is an explanatory diagram of an example of a series of processes for which reconfiguration is to be performed.

FIG. 4 is an explanatory diagram of an example of a series of processes for which reconfiguration is to be performed. In the example depicted in FIG. 4, the series of processes for which reconfiguration is to be performed is a group of processes A to D, arranged in the order of execution. Prior to reconfiguration, the processes A, B, and C among the series of processes A to D are executed by software ("SW" in FIG. 4), whereas the process D is executed by hardware ("HW" in FIG. 4).

Because hardware for executing the processes A, B, and C has not been prepared, these processes A, B, and C are instead executed by software prior to reconfiguration. In contrast, because dedicated hardware for executing the process D has been prepared, the process D is executed by hardware from the beginning.

The detecting unit 301 detects a process(es) under execution by software, among the series of processes A to D. In this example, the detecting unit 301 detects any one among "process A", "process B", "process C", "processes A and B", "processes B and C", and "processes A and C" under execution by software.

The reference of the description now returns to FIG. 3. The building unit 302 builds on hardware, a logic circuit that realizes the function of the process detected by the detecting unit 301. For example, a logic circuit realizing the function of the process may be built by writing to hardware, hardware description information for realizing the function of the process.

Hardware description information describes circuit hardware operation at a language level, i.e., in a hardware description language, such as VHDL and Verilog. For example, hardware description information is loaded into a memory element of a SRAM-type memory cell structure built in the hardware to cause the built logic circuit to operate as the design-based logic circuit.

Hardware description information for realizing the function of each process making up the series of processes is stored in advance to a memory area, such as ROM and RAM. The building unit 302 reads from the memory area, hardware description information corresponding to the process detected by the detecting unit 301, and writes the hardware description information to hardware.

For example, if the process A, which is under execution by software, is detected among the series of processes A to D depicted in FIG. 4, hardware description information for realizing the function of the process A is read from the memory area, and is written to hardware.

Following the building of the logic circuit by the building unit 302, the switching unit 303 switches execution of the detected process from execution by software over to execution by the logic circuit built on hardware. This means that during execution of the series of processes, the function realized by the detected process is switched from being a software-dependent function to a hardware-dependent function.

An example of the switching process by the switching unit 303 will be described. The apparatus body is provided with a switch for switching execution of a detected process. The switching unit 303 controls the switch to switch execution of the process from execution by software over to execution by a logic circuit built on hardware.

For example, if a logic circuit for realizing the function of the process A of FIG. 4 is built, the above switch is controlled to switch execution of the process A from execution by software over to execution by a logic circuit built on hardware. As a result, among the series of processes A to D, the processes A and D are executed by hardware, whereas the processes B and C are executed by software.

When execution of the process A is switched from execution by software over to execution by hardware, execution of the process A by software is suspended and the program(s) stored in the RAM for executing the process A may be deleted.

Following execution of the switching by the switching unit 303, the determining unit 304 determines whether a process under execution by the software is present among the series of processes. For example, the determining unit 304 may determine whether a process (under execution by software) not detected by the detecting unit 301 is present.

If the determining unit 304 determines that a process under execution by software is present, the detecting process by the detecting unit 301, the building process by the building unit 302, and the switching process by the switching unit 303 may be executed, e.g., a process is detected from among remaining processes under execution by software and a sequence of processes is executed repeatedly until no processes under execution by software remain.

For example, in executing the series of processes A to D of FIG. 4, a case is assumed where execution of the process A is switched from execution by software over to execution by hardware. In this case, the determining unit 304 determines the presence of the processes B and C under execution by software, thereby causing the detecting unit 301, the building unit 302, and the switching unit 303 to repeat various processes, respectively.

Examples of the detecting process by the detecting unit 301 will be described. In a first example, the detecting unit 301 may detect processes in the order of execution of the series of processes. Information for identifying the order of execution is stored in the memory area, such as ROM and RAM. For example, information for identifying the order of execution is read from the memory area, and processes are detected in the order of execution identified from the read information.

For example, in executing the series of processes A to D of FIG. 4, the processes A, B, and C under execution by the software are detected in ascending order of "process A, process B, and process C". This simplifies control over the transmission/reception of calculation data among the processes included in the series of processes (e.g., control over the above switch) to reduce overhead for hardware reconfiguration.

In a second example, the detecting unit 301 may detect processes in the reverse order of execution. For example, information for identifying the order of execution is read from the memory area, and the processes are detected in the reverse order of execution identified from the read information.

For example, in executing the series of processes A to D of FIG. 4, the processes A, B, and C under execution by the software are detected in descending order of "process A, process B, and process C". This simplifies control over transmission/reception of calculation data among the processes included in the series of processes to reduce overhead for hardware reconfiguration.

In a third example, the detecting unit 301 may detect processes in a predetermined order of detection. This order of detection can be set by a user. For example, among the series of processes, a process consuming relatively more time for execution by software may be detected preferentially, thereby enabling a process prone to cause bottlenecking to be detected first in sequentially detecting the series of processes.

A process having a large effect on the quality of a function realized by executing the series of processes may be detected preferentially with consideration of control over transmission/reception of calculation data among processes and a tradeoff effect on execution time. A process consuming relatively less time for reconfiguration (the building process by the building unit 302) may be detected preferentially.

Information for identifying the order of detection may be input directly to the dynamic reconfiguration apparatus 200, or may be acquired from an external computer. Information for identifying the acquired or input order of detection is stored to the memory area. The detecting unit 301 reads this information from the memory area to detect processes in the order of detection identified from the read information.

A logic circuit built on hardware by the building unit 302 may be deleted when the series of processes are finished. In executing the series of processes, if a logic circuit for realizing a different function has already been built on the hardware, the logic circuit (unless in the process of being built) may be deleted using the time for reconfiguring the hardware to realize the function of a detected process.

Figure 5:
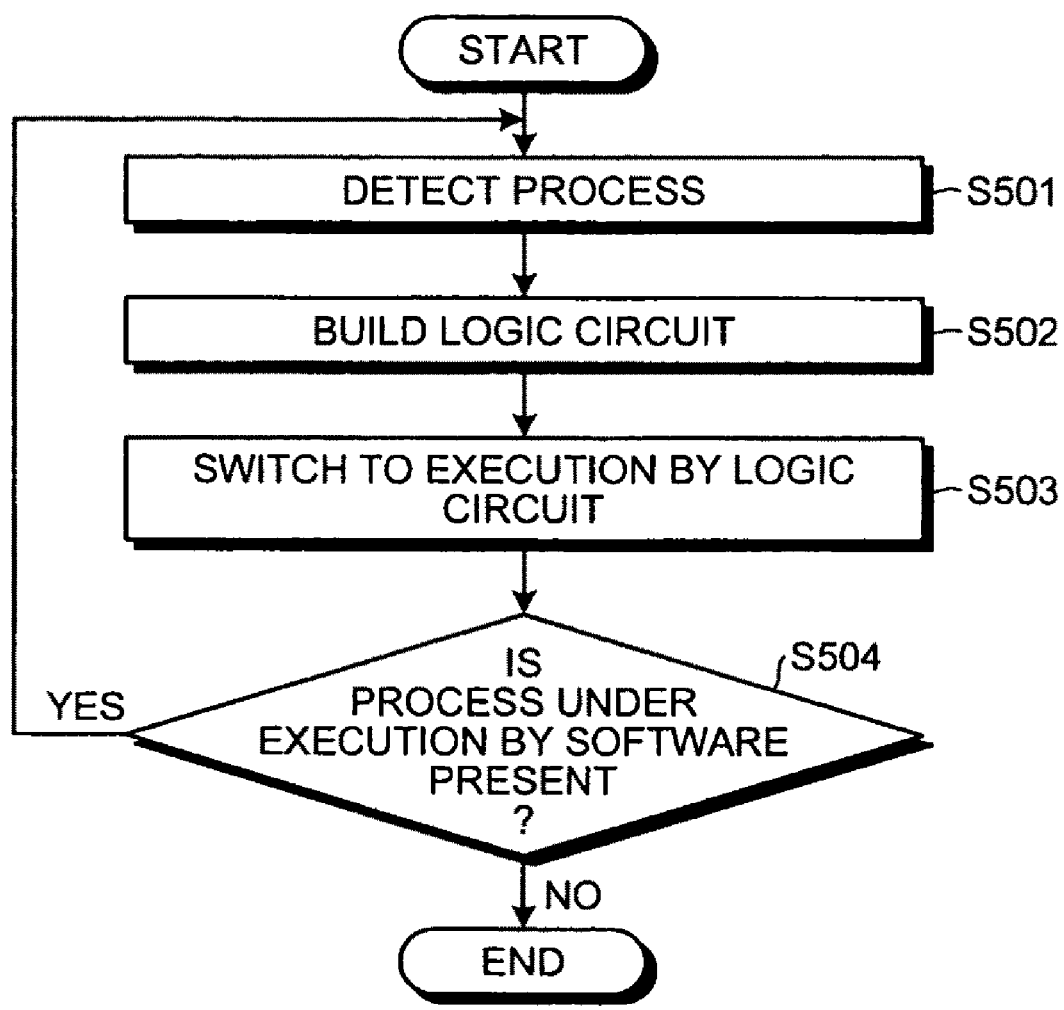
FIG. 5 is a flowchart of a dynamic reconfiguration procedure by the dynamic reconfiguration apparatus.

FIG. 5 is a flowchart of a dynamic reconfiguration procedure by the dynamic reconfiguration apparatus 200.

As depicted in the flowchart of FIG. 5, the detecting unit 301 detects a process under execution by software among a series of processes for which reconfiguration is to be performed (step S501). Subsequently, the building unit 302 builds on hardware, a logic circuit that realizes the function of the process detected by the detecting unit 301 (step S502).

Following the building of the logic circuit by the building unit 302, the switching unit 303 switches execution of the process from execution by software over to execution by the logic circuit built on hardware (step S503). The determining unit 304 then determines whether a process under execution by software is present among the series of processes (step S504).

If a process under execution by software is determined to be present (step S504: YES), the procedure returns to step S501, from which processes at steps S501 to S503 are repeated. If no process under execution by software is determined to be present (step S504: NO), a sequence of the processes in the flowchart ends.

According to the embodiment described above, execution of a process is switched from execution by software over to execution by hardware during execution of the series of processes. As a result, the speed of execution of the processes is increased process by process while execution of the series of processes continues.

Hardware reconfiguration is executed until there are no longer any processes under execution by software. As a result, the execution of each process included in the series of processes is switched process by process from execution by software over to execution by hardware.

Execution of a process may be switched from execution by software over to execution by hardware in the order of execution or in the reverse order of execution of the series of processes. This simplifies control over transmission/reception of calculation data among processes included in the series of processes, and reduces overhead for hardware reconfiguration.

Execution of a detected process may be switched from execution by software over to execution by hardware in a predetermined order of detection. For example, reconfiguration is executed preferentially for a process having a large effect on the quality of a function realized by executing the series of processes, such as a process prone to cause bottlenecking. This achieves more effective improvement in quality.

Figure 6:
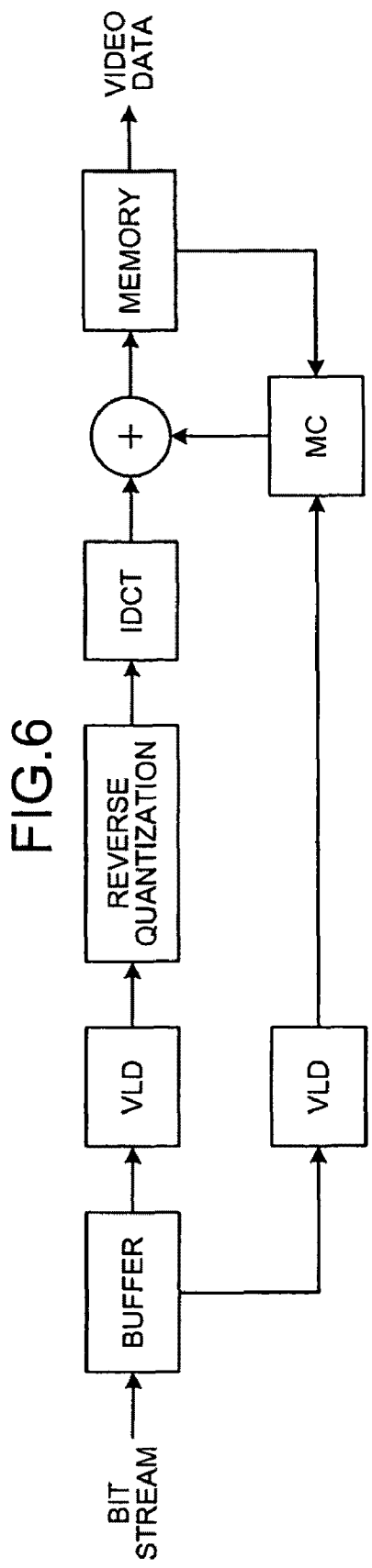
FIG. 6 is a block diagram of a series of functions of a decoder.

An example of the above embodiment will be described in which a decoding process of decoding coded moving image data is used to describe dynamic reconfiguration. FIG. 6 is a block diagram of a series of functions of a decoder. As depicted in FIG. 6, the decoder includes functions of variable length decoding (VLD), reverse quantization, inverse discrete cosine transform (IDCT), and motion compensation (MC).

For example, a series of processes (a VLD process, a reverse quantization process, an IDCT process, an MC process) for realizing the above functions (VLD, reverse quantization, IDCT, MC) are executed on a bit stream for each frame read from a buffer. As a result, decoded video data is output from a memory. Prior to reconfiguration, the above functions are realized by software.

First, the series of processes for realizing the above functions is started by software and hardware reconfiguration is also started. When hardware reconfiguration is completed, the execution of the corresponding process is then switched from execution by software over to execution by the hardware. In this manner, execution of the series of processes for realizing the functions of the decoder is switched process by process from execution by the software over to execution by the hardware to realize the functions of the decoder ultimately by the hardware.

In this case, the detecting process by the detecting unit 301 of FIG. 3 is executed in the order (MC process→IDCT process→reverse quantization process→VLD process) reverse to the order of execution of the series of processes (VLD process→reverse quantization process→IDCT process→MC process) for realizing the above functions.

Figure 7:
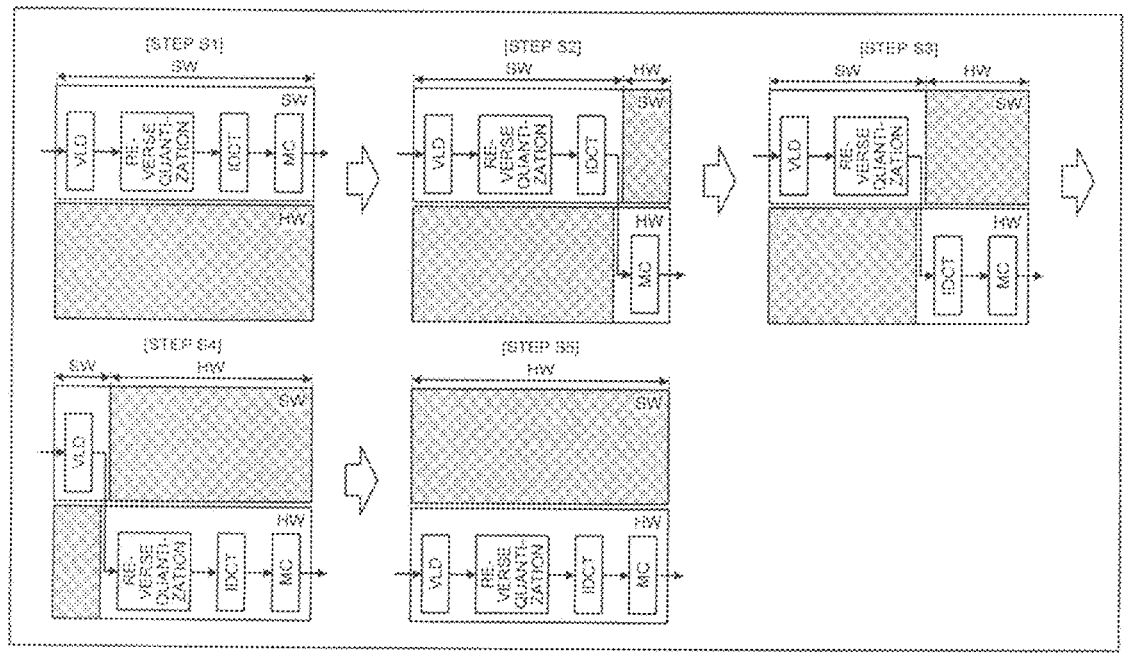
FIG. 7 is a schematic of dynamic reconfiguration.

FIG. 7 is a schematic of dynamic reconfiguration. At [step S1] in FIG. 7, the series of processes (VLD process, reverse quantization process, IDCT process, MC process) for realizing the above functions (VLD, reverse quantization, IDCT, MC) are executed by software.

At [step S2], the detecting unit 301 detects the MC process among the series of processes for which reconfiguration is to be performed (VLD process, reverse quantization process, IDCT process, MC process), and the building unit 302 builds on hardware, a logic circuit that realizes the function of the MC process. The switching unit 303 switches execution of the MC process from execution by software over to execution by the logic circuit built on hardware.

As a result, among the series of processes (VLD process, reverse quantization process, IDCT process, MC process) for realizing the functions of the decoder, the VLD process, the reverse quantization process, and the IDCT process are executed by software, while the MC process for which reconfiguration has been completed is executed by hardware. The program for executing the MC process is deleted at the point of completion of reconfiguration.

At [step S3], the detecting unit 301 detects the IDCT process among the series of processes for which reconfiguration is to be performed (VLD process, reverse quantization process, IDCT process, MC process), and the building unit 302 builds on hardware, a logic circuit that realizes the function of the IDCT process. The switching unit 303 switches execution of the IDCT process from execution by software over to execution by the built logic circuit.

As a result, among the series of processes (VLD process, reverse quantization process, IDCT process, MC process) for realizing the functions of the decoder, the VLD process and the reverse quantization process are executed by software, while the MC process and the IDCT process for which reconfiguration has been completed are executed by hardware. At this point, the program for executing the IDCT process and for which reconfiguration has been completed is deleted.

At [step S4], the detecting unit 301 detects the reverse quantization process among the series of processes for which reconfiguration is to be performed (VLD process, reverse quantization process, IDCT process, MC process), and the building unit 302 builds on hardware, a logic circuit that realizes the function of the reverse quantization process. The switching unit 303 switches execution of the reverse quantization process from execution by software over to execution by the built logic circuit.

As a result, among the series of processes (VLD process, reverse quantization process, IDCT process, MC process) for realizing the functions of the decoder, the VLD process is executed by software, while the MC process, the IDCT process, and the reverse quantization process for which reconfiguration has been completed are executed by hardware. At this point, the program for executing the reverse quantization process and for which reconfiguration has been completed is deleted.

At [step S5], the detecting unit 301 detects the VLD process among the series of processes for which reconfiguration is to be performed (VLD process, reverse quantization process, IDCT process, MC process), and the building unit 302 builds on hardware, a logic circuit that realizes the function of the VLD process. The switching unit 303 switches execution of the VLD process from execution by software over to execution by the built logic circuit.

Figure 8:
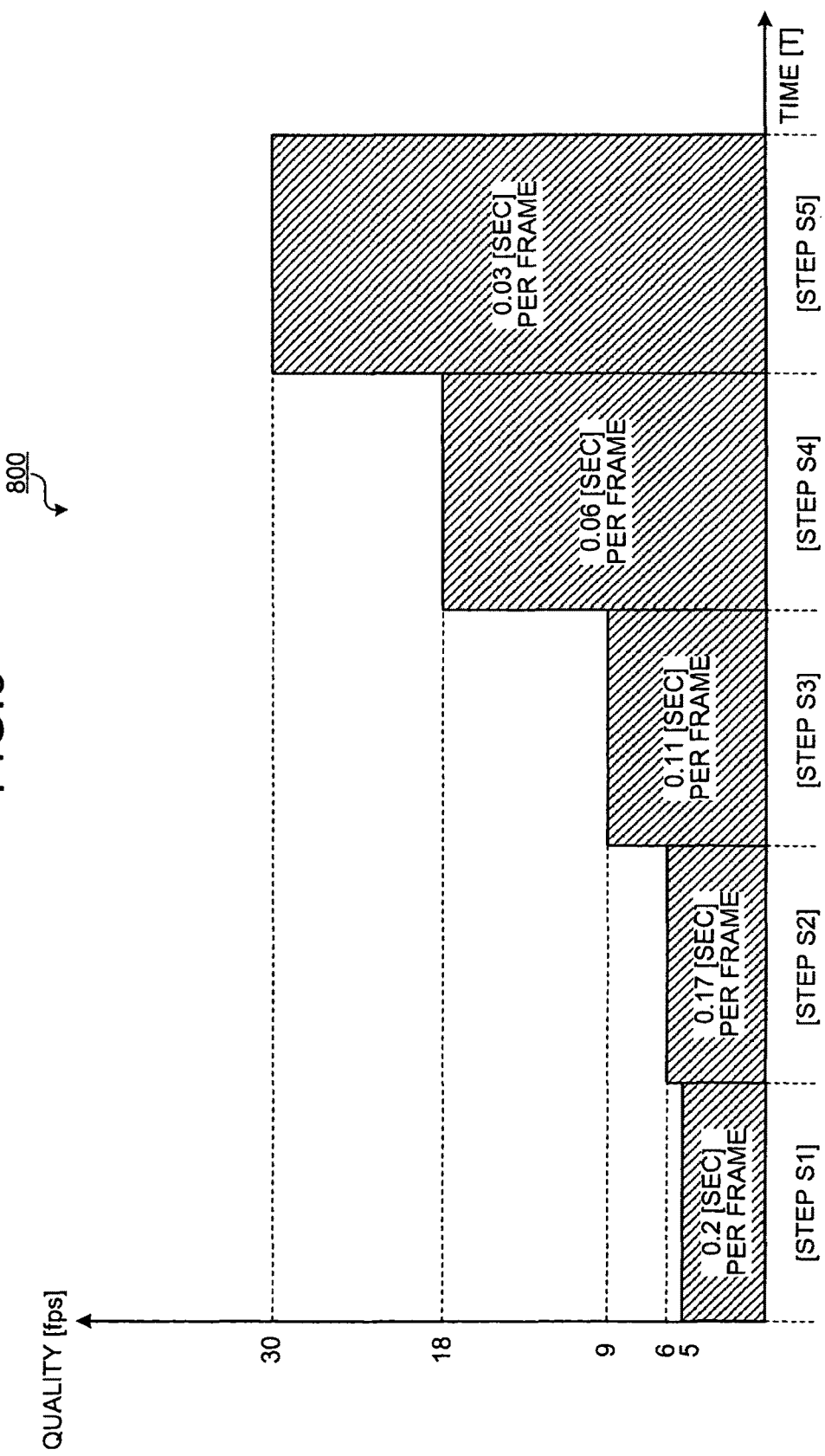
FIG. 8 is a graph depicting changes in the quality of a moving image.

As a result, the entire series of processes (VLD process, reverse quantization process, IDCT process, and MC process) for realizing the functions of the decoder are executed by hardware. At this point, the program for executing the VLD process is deleted at the point of completion of reconfiguration FIG. 8 is a graph depicting changes in the quality of a moving image. In FIG. 8, a graph 800 depicts the quality of the moving image at [step S1] to [step S5] of FIG. 7. In the graph 800, the vertical axis represents quality [fps] and the horizontal axis represents time [T]. The quality is expressed by the number of frames per unit time, i.e., as the quality improves, the number of frames per unit time increases, thus leading to display of a smoother moving image.

For example, the quality of the moving image is 5 [fps] at [step S1] at which hardware reconfiguration realizing the function of MC is in progress. The quality of the moving image is 6 [fps] at [step S2] at which hardware reconfiguration realizing the function of IDCT is in progress, i.e., realizing the function of MC by hardware raises the quality from 5 [fps] at [step S1] to 6 [fps].

Further, the quality of the moving image is 9 [fps] at [step S3] at which hardware reconfiguration realizing the function of reverse quantization is in progress, i.e., realizing the function of IDCT by hardware raises the quality from 6 [fps] at [step S2] to 9 [fps].

Further, the quality of the moving image is 18 [fps] at [step S4] at which hardware reconfiguration realizing the function of VLD is in progress, i.e., realizing the function of reverse quantization by hardware raises the quality from 9 [fps] at [step S3] to 18 [fps].

The quality of the moving image is 30 [fps] at [step S5] at which hardware reconfiguration realizing the series of functions (VLD, reverse quantization, IDCT, MC) is completed, i.e., realizing the function of VLD by hardware raises the quality from 18 [fps] at [step S4] to 30 [fps].

In this manner, hardware realizing the series of functions (VLD, reverse quantization, IDCT, MC) is reconfigured process by process for each function. This gradually shortens processing time consumed for decoding each frame and thus, improves the quality of the moving image.

Figure 9:
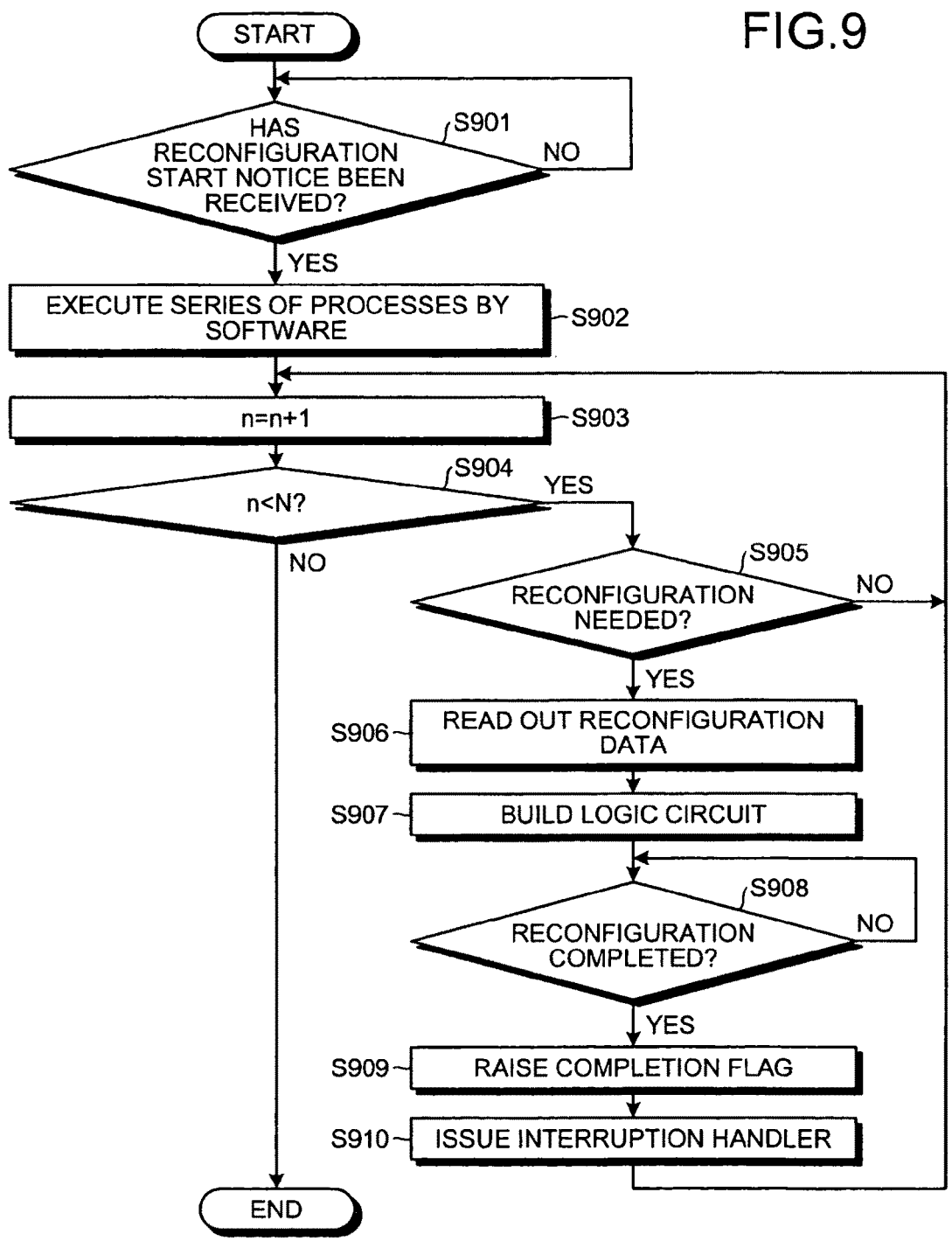
FIG. 9 is a flowchart of an exemplary dynamic reconfiguration procedure.

FIG. 9 is a flowchart of an exemplary dynamic reconfiguration procedure. As depicted in the flowchart of FIG. 9, whether a reconfiguration start notice has been received is determined (step S901). A reconfiguration start notice is a moving image reproduction instruction, etc., from a user. For example, the user may operate the input device 220, such as the keyboard 221 and the mouse 222, of FIG. 2 to input a reconfiguration start notice, which is received by the apparatus.

Reception of the reconfiguration start notice is waited for (step S901: NO), and upon reception of the reconfiguration start notice (step S901: YES), the series of processes (VLD process, reverse quantization process, IDCT process, MC process) for realizing the functions of the decoder (VLD, reverse quantization, IDCT, MC) are executed by software (step S902).

Figure 10:
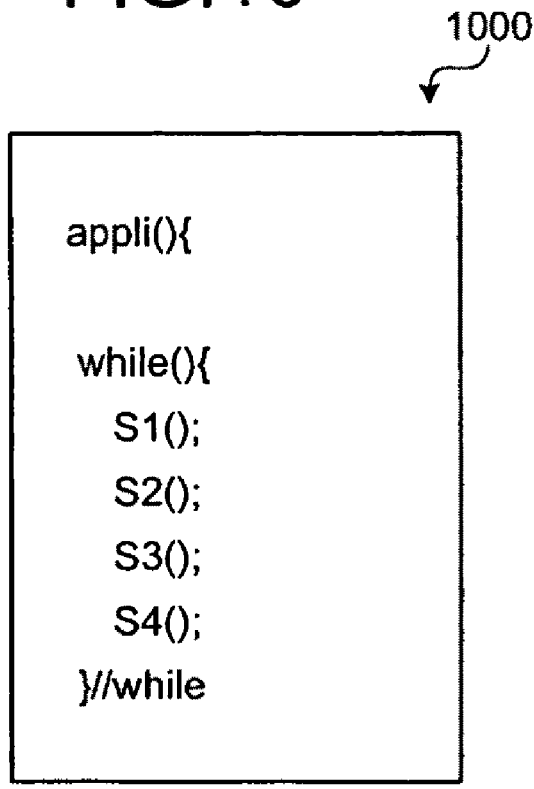
FIG. 10 is an explanatory diagram of an example of a program for executing a series of processes by software.

For example, a program(s) relevant to the above functions (VLD, reverse quantization, IDCT, MC) is executed by the CPU. FIG. 10 is an explanatory diagram of an example of a program for executing the series of processes by software. As depicted in FIG. 10, the program 1000 includes written source codes for executing the series of processes (VLD process, reverse quantization process, IDCT process, and MC process).

The CPU, following a While statement in the program 1000, executes the series of processes (VLD process, reverse quantization process, IDCT process, MC process). In FIG. 10, S1 represents the VDL process, S2 represents the reverse quantization process, S3 represents the IDCT process, and S4 represents the MC process. Details of the program for executing the processes are omitted in depiction and description.

An integer n (initial value: n=0) for identifying the above functions (VLD, reverse quantization, IDCT, MC) is increased by 1 (step S903). Values of the integer n correspond to the respective functions (VLD, reverse quantization, IDCT, MC) such that n=1 corresponds to VDL, n=2 to reverse quantization, n=3 to IDCT, and n=4 to MC.

Subsequently, whether the integer n is smaller than an integer N is determined (step S904). The integer N represents the total number of the functions (VLD, reverse quantization, IDCT, MC). In this example, the integer N takes a value of "4". If the integer n is determined to be smaller than the integer N (step S904: YES), whether hardware reconfiguration realizing the function identified from the integer n is necessary is determined (step S905).

For example, hardware reconfiguration may be determined to be unnecessary for a process that does not consume much processing time when executed by software. A function requiring hardware reconfiguration may be set in advance, and by referring to such setting, whether hardware reconfiguration to realize the function identified from the integer n is to be performed may be determined.

If reconfiguration is determined to be unnecessary at step S905 (step S905: NO), the procedure returns to step S903. If it is determined that reconfiguration is to be performed (step S905: YES), reconfiguration data for reconfiguring hardware to realize the function identified from the integer n is read from the memory area (step S906), and a logic circuit realizing the function identified from the integer n is built on the hardware (step S907). Reconfiguration data is equivalent to the above hardware description information.

Subsequently, whether reconfiguration of the hardware realizing the function identified from the integer n has been completed is determined (step S908). Completion of the reconfiguration is waited for (step S908: NO), and when reconfiguration has been completed (step S908: YES), a completion flag for the function identified from the integer n is raised in a status register (step S909).

Figure 11:
FIG. 11 is an explanatory diagram of an example of a status register.

FIG. 11 is an explanatory diagram of an example of the status register. A status register 1100 of FIG. 11 holds a completion flag indicative of whether hardware reconfiguration realizing the above functions (VLD, reverse quantization, IDCT, MC) has been completed.

In the status register 1100, H1 denotes hardware realizing the function of VLD, H2 denotes hardware realizing the function of reverse quantization, H3 denotes hardware realizing the function of IDCT, and H4 denotes hardware realizing the function of MC. The CPU refers to the status register 1100 to determine whether hardware reconfiguration realizing each of the functions has been completed. In the example depicted in FIG. 11, the CPU refers to the status register 1100 and determines that, among the functions (VLD, reverse quantization, IDCT, MC), hardware reconfiguration realizing the function of VLD has been completed.

The reference of the description now returns to FIG. 9. Following step S909, an interruption handler for the function indicated by a completion flag raised in the status register (e.g., status register 1100) is issued (step S910), and the procedure returns to step S903, i.e., execution of a process realizing the function identified from the integer n is switched from execution by software over to execution by the logic circuit built at step S907.

If the integer n is determined to be larger than the integer N at step S904 (step 904: NO), a sequence of processes of the flowchart is ended.

The process at step S903 is equivalent to the detecting process by the detecting unit 301 of FIG. 3, the processes at steps S906 and S907 are equivalent to the building process by the building unit 302, the process at step S909 is equivalent to the switching process by the switching unit 303, and the process at step S904 is equivalent to the determining process by the determining unit 304.

FIG. 12 is an explanatory diagram of an example of a program for executing the dynamic reconfiguration procedure. As depicted in FIG. 12, the program 1200 includes written source codes for realizing the dynamic reconfiguration procedure of FIG. 9.

According to the written contents of the program 1200, the dynamic reconfiguration apparatus 200 determines for each process included a series of processes whether hardware has been reconfigured. If hardware has been reconfigured, the process is executed by the hardware. If hardware has not been reconfigured, the process is executed by software instead.

For example, the dynamic reconfiguration apparatus 200 operates according to a logical configuration in which the dynamic reconfiguration apparatus 200 determines whether hardware reconfiguration realizing the function of MC has been completed. If reconfiguration has been completed, the dynamic reconfiguration apparatus 200 causes the hardware to execute the MC process and waits for the process. If reconfiguration has not been completed, the dynamic reconfiguration apparatus 200 causes the software to execute the MC process. The dynamic reconfiguration apparatus 200 performs such control for each of the functions until hardware reconfiguration realizing all the functions is completed.

In the example described above, execution of a process is switched from execution by software over to execution by hardware during execution of the series of processes (VLD process, reverse quantization process, IDCT process, MC process) realizing the functions of the decoder. As a result, the speed of the processes can be increased process by process while the decoding process is executed continuously.

In this manner, the execution of each process included in the series of processes is switched process by process from execution by software over to execution by hardware, thereby reducing overhead for hardware reconfiguration, thus speeding up the decoding process and improving the quality of the moving image.

For example, the number of frames per unit time is gradually increased during reproduction of a moving image to improve output (video data) response. As a result, during reproduction of the moving image, the quality of the moving image gradually improves over time, thereby relieving the user of stress experienced from viewing a low-quality moving image.

With respect to devices having fewer hardware resources available, such as a cellular phone, in particular, application of the dynamic hardware reconfiguration according to the embodiment improves the output response of such devices, enabling provision of adequate services (TV phone, 1-seg broadcasting, etc.).

As described, according to the embodiment, a software-dependent function is switched process by process over to a hardware-dependent function to reduce overhead for hardware reconfiguration and achieve improved output response and lower power consumption.

The dynamic reconfiguration method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the recording medium, and executed by the computer. The program may be a transmission medium that can be distributed through a network such as the Internet.

The dynamic reconfiguration apparatus 200 described in the present embodiment can be realized by an application specific integrated circuit (ASIC) such as a standard cell or a structured ASIC, or a programmable logic device (PLD) such as a field-programmable gate array (FPGA). Specifically, for example, functional units (301 to 304) of the dynamic reconfiguration apparatus 200 are defined in hardware description language (HDL), which is logically synthesized and applied to the ASIC, the PLD, etc., thereby enabling manufacture of the dynamic reconfiguration apparatus 200.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium storing therein a dynamic reconfiguration program that switches process by process, execution of a series of processes for which reconfiguration is to be performed, from execution by software over to execution by hardware, the dynamic reconfiguration program causing a computer to execute:
   detecting in an order reverse to that in which the series of processes is executed, a process that is among the series of processes and under execution by the software;
   building on the hardware, a logic circuit realizing a function of the detected process; and
   switching execution of the process from execution by the software over to execution by the built logic circuit.

2. The computer-readable recording medium according to claim 1 and storing therein the dynamic reconfiguration program that further causes the computer to execute:
   determining, subsequent to the switching, whether a process under execution by the software is present among the series of processes, wherein
   the detecting, the building, and the switching are executed by the computer when, at the determining, a process under execution by the software is determined to be present.

3. The computer-readable recording medium according to claim 1, wherein
   the detecting includes detecting in a preset order.

4. The computer-readable recording medium according to claim 1, wherein
   the building includes writing, to the hardware, hardware description information for realizing the function of the process to build the logic circuit.

5. A dynamic reconfiguration apparatus that switches process by process, execution of a series of processes for which reconfiguration is to be performed, from execution by software over to execution by hardware, the dynamic reconfiguration apparatus comprising:

a detecting unit that detects in an order reverse to that in which the series of processes is executed, a process that is among the series of processes and under execution by the software;

a building unit that builds on the hardware, a logic circuit realizing a function of the detected process; and a switching unit that switches execution of the process from execution by the software over to execution by the built logic circuit.

6. The dynamic reconfiguration apparatus according to claim 5 and further comprising:

a determining unit that, subsequent to execution switching by the switching unit, determines whether a process under execution by the software is present among the series of processes, wherein the detecting unit detects a process among the series of processes remaining under execution by the software, when the determining unit determines that a process under execution by the software is present.

7. The dynamic reconfiguration apparatus according to claim 5, wherein the detecting unit detects the series of processes in a preset order.

8. The dynamic reconfiguration apparatus according to claim 5, wherein the building unit writes, to the hardware, hardware description information for realizing the function of the process to build the logic circuit.

9. A dynamic reconfiguration method that switches process by process, execution of a series of processes for which reconfiguration is to be performed, from execution by software over to execution by hardware, the dynamic reconfiguration method comprising:

detecting, by using a computer and in an order reverse to that in which the series of processes is executed, a process that is among the series of processes and under execution by the software;

building on the hardware, a logic circuit realizing a function of the detected process; and switching execution of the process from execution by the software over to execution by the built logic circuit.

10. The dynamic reconfiguration method according to claim 9 and further comprising:

determining, subsequent to the switching, whether a process under execution by the software is present among the series of processes, wherein the detecting, the building, and the switching are executed by the computer when, at the determining, a process under execution by the software is determined to be present.

11. The dynamic reconfiguration method according to claim 9, wherein the detecting includes detecting in a preset order.

12. The dynamic reconfiguration method according to claim 9, wherein the building includes writing, to the hardware, hardware description information for realizing the function of the process to build the logic circuit.

* * * * *